US007706472B2

(12) United States Patent
Vorenkamp

(10) Patent No.: US 7,706,472 B2
(45) Date of Patent: Apr. 27, 2010

(54) METHODS AND SYSTEMS FOR DETECTING DEFECTS IN SERIAL LINK TRANSCEIVERS

(75) Inventor: Pieter Vorenkamp, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/292,096

(22) Filed: Nov. 12, 2008

(65) Prior Publication Data

US 2009/0074110 A1   Mar. 19, 2009

Related U.S. Application Data

(63) Continuation of application No. 10/760,583, filed on Jan. 21, 2004, now Pat. No. 7,460,585.

(60) Provisional application No. 60/516,735, filed on Nov. 4, 2003.

(51) Int. Cl.
 *H04L 27/00* (2006.01)
(52) U.S. Cl. .................................................. 375/316
(58) Field of Classification Search .............. 375/224, 375/257, 258, 316, 346
See application file for complete search history.

(56) References Cited

U.S. PATENT DOCUMENTS

| 3,857,069 | A | 12/1974 | Howell |
| 4,782,300 | A | 11/1988 | Bonaccio et al. |
| 5,347,538 | A | 9/1994 | Marbot |
| 6,373,262 | B1 | 4/2002 | Herring et al. |
| 6,392,448 | B1 | 5/2002 | Vadipour |
| 6,791,369 | B1 | 9/2004 | Hattori |
| 6,943,591 | B1 | 9/2005 | Hannan et al. |
| 7,200,176 | B1 | 4/2007 | Paulos et al. |
| 7,460,585 | B2 | 12/2008 | Vorenkamp |
| 2004/0080365 | A1* | 4/2004 | Wentink ............... 330/69 |
| 2004/0229591 | A1* | 11/2004 | Jurek ................... 455/315 |
| 2005/0040864 | A1 | 2/2005 | Ficken et al. |

* cited by examiner

*Primary Examiner*—Don N Vo
(74) *Attorney, Agent, or Firm*—Sterne, Kessler, Goldstein & Fox P.L.L.C.

(57) ABSTRACT

Methods and systems for detecting defects in serial link transceivers. Defect detection includes detecting open circuits in one or more of the transmission lines, detecting short circuits between one or more of the transmission lines and a power supply, detecting short circuits between the transmission lines, or detecting short circuits across optional AC-couplings in the transmission lines. The detection can include direct or indirect detection of voltage or current.

20 Claims, 6 Drawing Sheets

METHODS AND SYSTEMS FOR DETECTING DEFECTS IN SERIAL LINK TRANSCEIVERS

CROSS-REFERENCE TO RELATED APPLICATIONS

This application is a continuation of U.S. application Ser. No. 10/760,583, filed Jan. 21, 2004, now U.S. Patent No. 7,460,585, which claims the benefit of U.S. Provisional Application No. 60/516,735, filed Nov. 4, 2003, both of which are incorporated herein by reference in their entirety.

BACKGROUND OF THE INVENTION

1. Field of the Invention

The present invention is directed to serial link transceivers and, more particularly, to detecting defects in serial link transceivers.

2. Related Art

Serial link transceivers, including but not limited to differential AC-coupled high-speed links, are susceptible to defects such as manufacturing defects. Such defects can include shorts between transmission lines and ground, shorts between transmission lines and power supplies, and open circuits in transmission lines.

There is thus a need for methods and systems for detecting defects in serial link transceivers.

SUMMARY OF THE INVENTION

The present invention is directed to methods and systems for detecting defects in serial link transceivers. The invention can be implemented in, for example and without limitation, an AC-coupled differential high-speed serial link transceiver ("transceiver"). In such a transceiver, a transmitter and receiver are coupled through differential AC-coupled or DC-coupled transmission lines, and the receiver can include a common mode control circuit. In accordance with the invention, a monitoring system detects one of:

open circuits in one of the transmission lines;

short circuits between one or more of the transmission lines and a power supply or ground plane;

short circuits between the transmission lines; and short circuits across the AC-coupling capacitors.

Additional features and advantages of the invention will be set forth in the description that follows. Yet further features and advantages will be apparent to a person skilled in the art based on the description set forth herein or may be learned by practice of the invention. The advantages of the invention will be realized and attained by the structure particularly pointed out in the written description and claims hereof as well as the appended drawings.

It is to be understood that both the foregoing summary and the following detailed description are exemplary and explanatory and are intended to provide further explanation of the invention as claimed.

BRIEF DESCRIPTION OF THE DRAWINGS/FIGURES

The present invention will be described with reference to the accompanying drawings, wherein like reference numbers indicate identical or functionally similar elements. Also, the leftmost digit(s) of the reference numbers identify the drawings in which the associated elements are first introduced.

DETAILED DESCRIPTION OF THE INVENTION

Introduction

Figure 1:
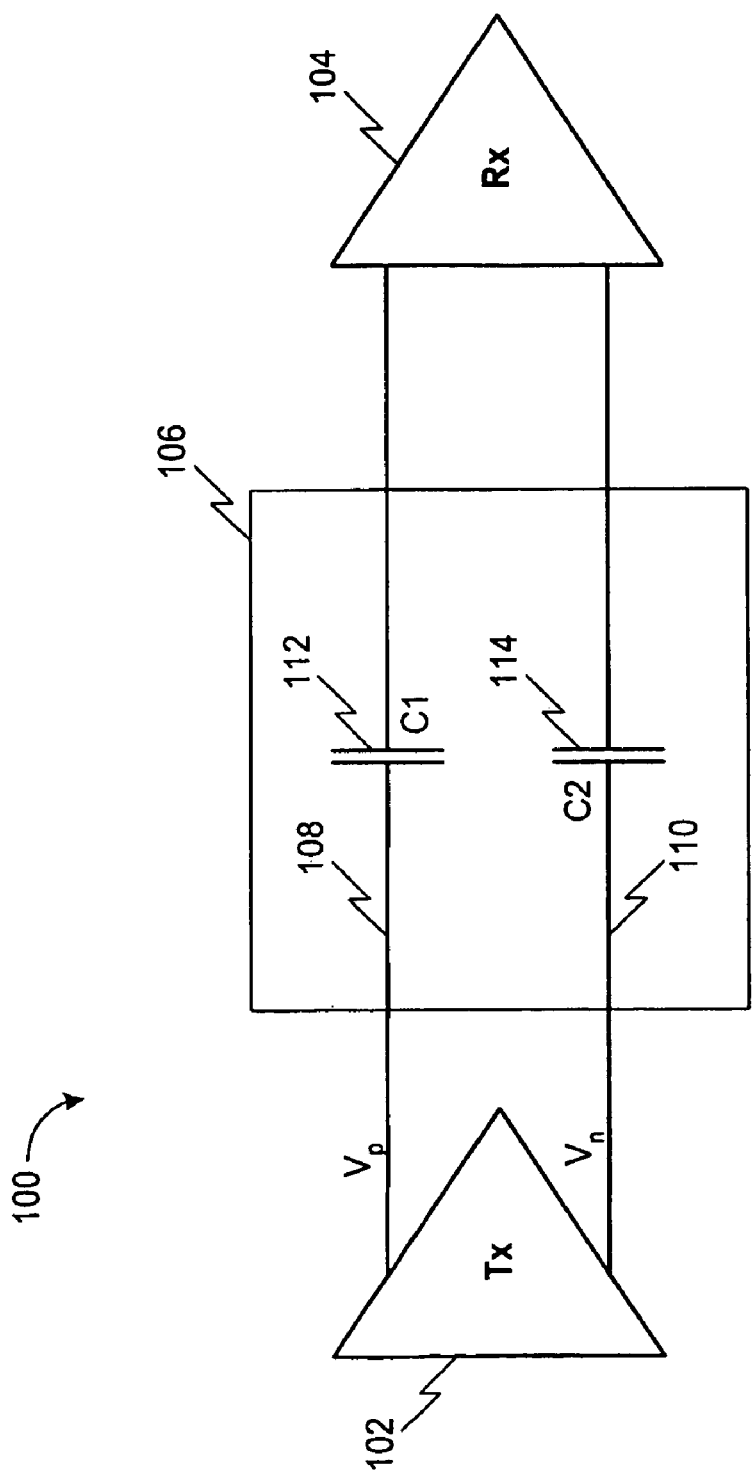
FIG. 1 is a block diagram of an example differential serial-link transceiver ("transceiver") 100.

FIG. 1 is a block diagram of an example differential serial-link transceiver ("transceiver") 100. The transceiver 100 includes a differential transmitter 102, a differential receiver 104, and a differential link 106. The differential link 106 includes differential transmission line 108 and 110. The differential transmitter 102 outputs Vp on the one leg of the differential transmission line 108, and Vn on the other leg of the differential transmission line 110. In the example of FIG. 1, the transmitter 102 and receiver 104 are AC coupled through capacitors 112 and 114, respectively. Alternatively, the capacitors 112 and 114 are omitted and the transmitter 102 and receiver 104 are DC coupled.

Defect Detection

The differential transceiver 100, or portions thereof, are typically implemented on one or more printed circuit boards ("PCBs"). Defects in the PCBs can be encountered during manufacturing and/or subsequent handling. Defects in the PCBs can reduce the performance of the transceiver 100 and/or render the differential transceiver 100 inoperable.

Figure 2:
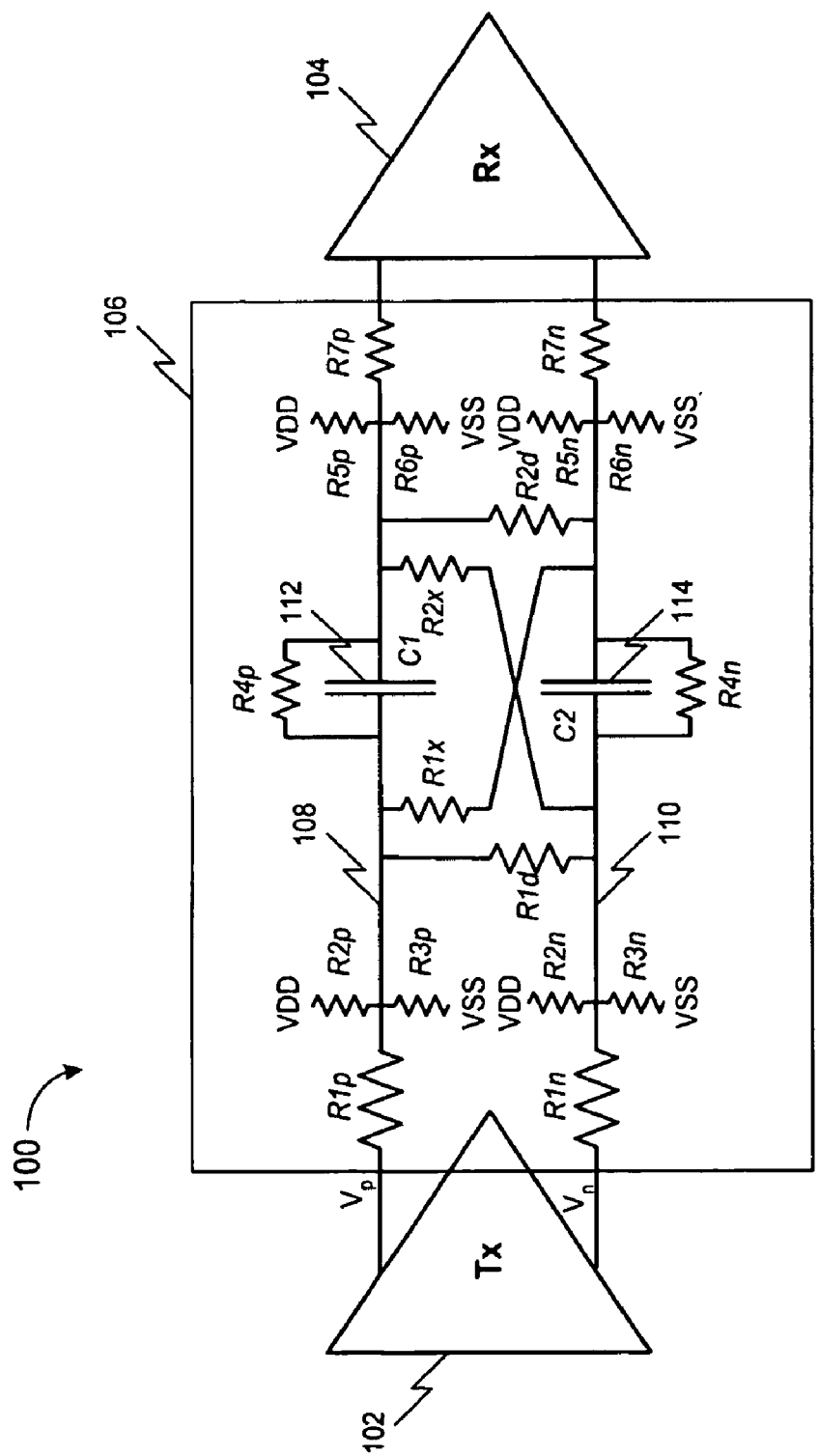
FIG. 2 is a block diagram of the transceiver 100, wherein a variety of potential defects are represented as shorts and/or open circuits.

FIG. 2 is a block diagram of the transceiver 100, wherein a variety of potential defects are represented as shorts and/or open circuits. The potential defects are described below.

The present invention is directed to methods and systems for detecting one of the defects represented in FIG. 2. Systems for detecting one of the defects represented in FIG. 2 include a monitoring circuit such as, without limitation, a voltage and/or current monitoring circuit.

The monitoring circuit can be implemented to directly or indirectly detect a defect. A direct monitoring circuit can be coupled to either of the differential transmission lines 108 and 110. An indirect monitoring circuit can be coupled to a circuit that supports the transceiver 100. For example, and without limitation, an indirect monitoring circuit can be coupled to a common mode control circuit that supports the transceiver 100. An indirect monitoring circuit has the advantage of not adding additional high speed circuitry to the transmission lines, and thus does not degrade system performance.

Figure 3:
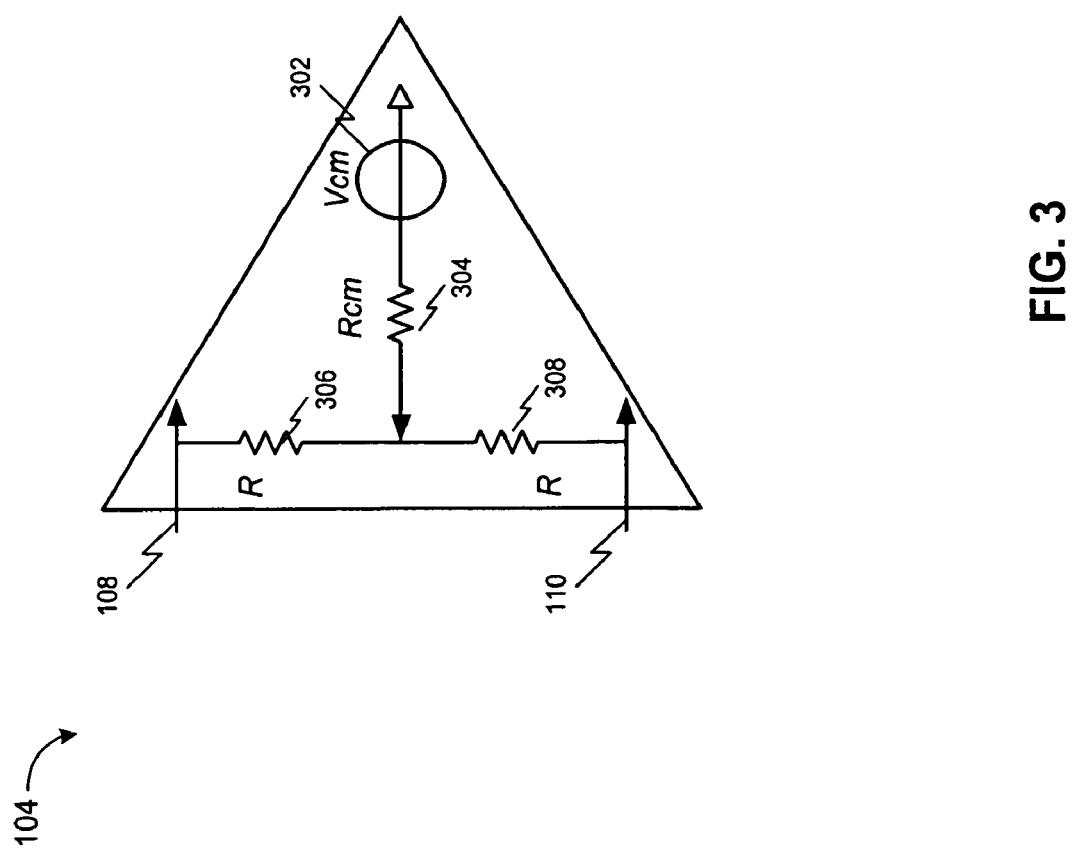
FIG. 3 is a block diagram of the differential receiver 104, including a common-mode control circuit Vcm 302.

FIG. 3 is a block diagram of a differential receiver 104, including an example common-mode control circuit Vcm 302. The common-mode control circuit maintains signals on the transmission lines 108 and 110 centered about a common mode voltage. Common-mode control circuits are well known in the art.

Under normal operating conditions, the common-mode control circuit Vcm 302 provides substantially zero DC current and zero AC current to the differential transmission lines 108 and 110. When there is a defect in the differential transceiver 100, however, the common-mode control circuit Vcm 302 will provide a DC current and/or an AC current to transmission line 108 and/or to transmission line 110 to maintain signal levels thereon at desired common mode levels.

Referring back to FIG. 2, example potential defects and corresponding reactions of the common-mode control circuit Vcm 302 are now described. The invention is not, however, limited to transceivers that include common-mode control circuits. The invention is also not limited to AC-coupled transceivers.

The example potential defects include fourteen potential defects in the positive and negative signal lanes (i.e., transmission lines 108 and 110). The potential defects also include two potential shorts between the positive and negative signal lanes, and two potential cross shorts across the AC coupling capacitances 112 and 114. The example potential defects are now described in detail with reference to FIG. 2.

R1$p$ represents a potential open circuit in the transmission line 108 between the transmitter 102 and the capacitor 112. When this occurs, the common-mode control circuit Vcm 302 provides an AC current that tracks Vin in an attempt to maintain signals on the transmission lines at a common mode voltage.

R2$p$ represents a potential short between the transmission line 108 and a power supply VDD between the transmitter 102 and the capacitor 112. When this occurs, the common-mode control circuit Vcm 302 provides an AC current that tracks Vp.

R3$p$ represents a potential short between the transmission line 108 and a power supply VSS between the transmitter 102 and the capacitor 112. When this occurs, the common-mode control circuit Vcm 302 provides an AC current that tracks Vp.

R4$p$ represents a potential short across the capacitor 112. When this occurs, the common-mode control circuit Vcm 302 sinks or sources a DC current.

R5$p$ represents a potential short between the transmission line 108 and the power supply VDD between the capacitor 112 and the receiver 104. When this occurs, the common-mode control circuit Vcm 302 provides an AC current that tracks Vp.

R6$p$ represents a potential short between the transmission line 108 and the power supply VSS between the capacitor 112 and the receiver 104. When this occurs, the common-mode control circuit Vcm 302 provides an AC current that tracks Vp.

R7$p$ represents a potential open in the transmission line 108 between the capacitor 112 and the receiver 104. When this occurs, the common-mode control circuit Vcm 302 provides an AC current that tracks Vp.

R1$n$ represents a potential open in the transmission line 110 between the transmitter 102 and the capacitor 114. When this occurs, the common-mode control circuit Vcm 302 provides an AC current that tracks Vn.

R2$n$ represents a potential short between the transmission line 110 and the power supply VDD between the transmitter 102 and the capacitor 114. When this occurs, the common-mode control circuit Vcm 302 provides an AC current that tracks Vn.

R3$n$ represents a potential short between the transmission line 110 and the power supply VSS between the transmitter 102 and the capacitor 114. When this occurs, the common-mode control circuit Vcm 302 provides an AC current that tracks Vn.

R4$n$ represents a potential short across the capacitor 114. When this occurs, the common-mode control circuit Vcm 302 sinks or sources a DC current.

R5$n$ represents a potential short between the transmission line 110 and the power supply VDD between the capacitor 114 and the receiver 104. When this occurs, the common-mode control circuit Vcm 302 provides an AC current that tracks Vn.

R6$n$ represents a potential short between the transmission line 110 and the power supply VSS between the capacitor 114 and the receiver 104. When this occurs, the common-mode control circuit Vcm 302 provides an AC current that tracks Vn.

R7$n$ represents a potential open circuit in the transmission line 110, between the capacitor 114 and the receiver 104. When this occurs, the common-mode control circuit Vcm 302 provides an AC current that tracks Vn.

R1$d$ and R2$d$ represent potential shorts between the transmissions line 108 and 110. When R1$d$ or R2$d$ occurs, no signal is presented at the receiver 104.

R1$x$ and R2$x$ represent potential shorts or cross-faults across the AC coupling capacitances 112 and 114. When R1$x$ occurs, the common-mode control circuit Vcm 302 provides an AC current that tracks Vn. When R2$x$ occurs, the common-mode control circuit Vcm 302 provides an AC current that tracks Vp.

Defects in the differential transceiver 100 can reduce the performance of the differential transceiver 100 and/or render it inoperable. Therefore, it is useful to know when there is a defect in the differential transceiver 100.

In many situations, it is sufficient to know that there is a defect in the differential transceiver 100. It is often not necessary to know the precise location of the defect, the precise nature of the defect, or the precise number of defects. For example, IEEE 1149.1 is an IEEE supported standard directed to detecting PCB manufacturability issues using on-chip monitoring functions. IEEE 1149.6 is an extension to the IEEE 1149.1 standard directed to high-speed differential signal lines using AC-coupling, such as in serializer/deserializer ("SERDES") transceivers. IEEE 1149.6 stipulates that defects be detectable using a pass/fail criteria. IEEE 1149 is incorporated herein by reference in its entirety.

Accordingly, the present invention is directed to methods and systems for detecting the presence of at least one serial-link interconnect defect.

Recall from above that the invention can be implemented by monitoring voltage or current, directly or indirectly. An example is provided below for indirectly monitoring current. The invention is not, however, limited to this example. Based on the description herein, one skilled in the relevant art(s) will understand how to detect a defect by monitoring voltage or current, directly or indirectly.

In the example of FIG. 3, the transceiver 100 includes a common-mode control circuit Vcm 302. In accordance with the invention, current provided by the common-mode control circuit Vcm 302 is monitored to indirectly detect one or more of the conditions discussed above. For example, AC and/or DC current provided by the common-mode control circuit Vcm 302 is monitored. When the AC and/or DC current provided by the common-mode control circuit Vcm 302 exceeds corresponding AC and/or DC current thresholds, a defect is declared. For AC and/or DC current monitoring, the corresponding threshold can be a fixed level. Alternatively, or additionally, the AC threshold is dynamically determined relative to Vp and/or Vn, and/or relative to one or more other variables.

Based on the description herein, one skilled in the relevant art(s) will understand that any conventional and/or yet to be developed current and/or voltage monitoring methods and/or systems, and/or combinations thereof, can be employed.

Figure 4:
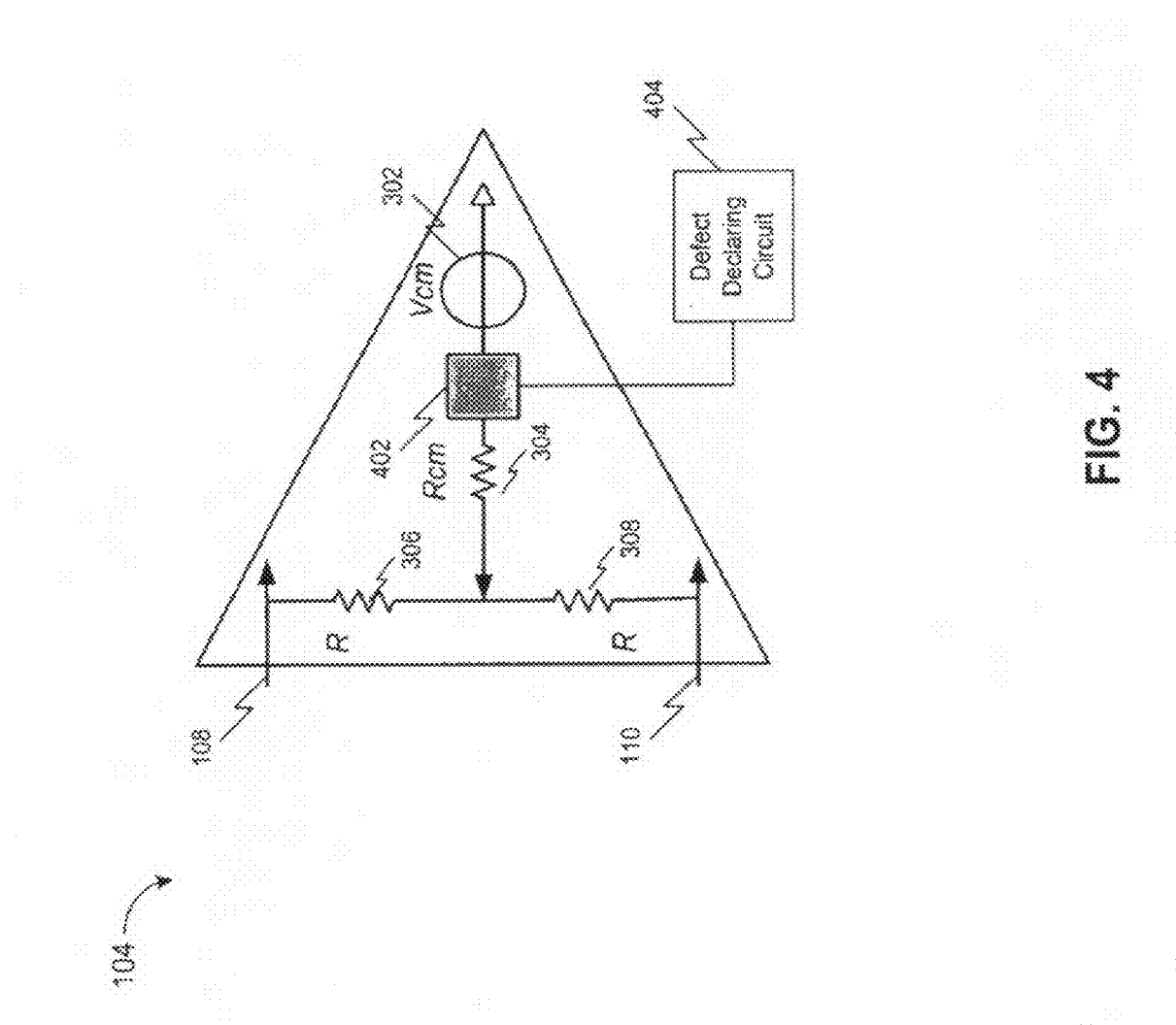
FIG. 4 is a block diagram of the receiver 104, including an example monitoring system 402.

FIG. 4 is a block diagram of the receiver 104, including an example monitoring system 402. In the example of FIG. 4, the monitoring system 402 is configured to monitor AC and/or DC current and/or voltage that is provided by the common-mode control circuit Vcm 302. Current and voltage monitoring systems are well known in the art.

In the example of FIG. 4, the monitoring system 402 is an indirect monitoring system. In alternative embodiments, the monitoring system 402 is coupled directly to one of the differential transmission lines 108 or 110 to monitor current or voltage directly.

The monitoring system 402 includes one or more of a variety of conventional and/or yet to be developed current monitoring systems, methods, and/or combinations thereof.

The monitoring system 402 includes one or more outputs 404 for outputting results of the monitoring. The monitoring system 402 outputs a fault indication on the output(s) 404 when the monitoring system 402 senses one or one or more current conditions indicative of the potential defects described herein.

In the example of FIG. 4, the monitoring system 402 is coupled between the common-mode control circuit Vcm 302 and a common-mode control circuit resistance Rcm 304. Alternatively, the monitoring system 402 is coupled between the common-mode control circuit resistance Rcm 304 and the transmission lines 108 and 110. Alternatively, the monitoring system 402 is coupled to a node between the common-mode control circuit Vcm 302 and the common-mode control circuit resistance Rcm 304, or to a node between the common-mode control circuit resistance Rcm 304 and the transmission lines 108 and 110, so that the monitoring system 402 is not directly in the Vcm signal path. Thus, when the monitoring system 402 is implemented as an indirect monitoring system, the invention does not require additional high-speed circuitry in the transmission lines 108 and/or 110, and thus does not degrade dynamic performance of the differential transceiver 100.

Alternatively, the monitoring system 402 is coupled directly to the transmission line 108 and/or 110.

Figure 5:
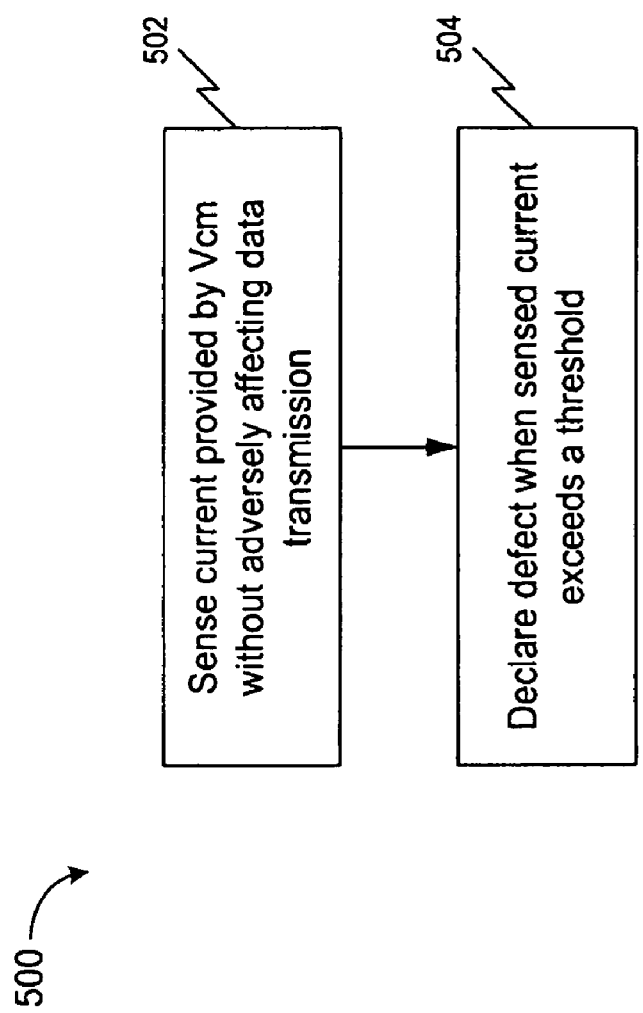
FIG. 5 is a flowchart of a method for detecting defects in a serial link transceiver.

FIG. 5 is a flowchart of a method 500 for indirectly detecting defects in a serial link transceiver having a common-mode control circuit, as illustrated in FIGS. 3 and 4. The method 500 is described in terms of monitoring current from a common-mode control circuit Vcm. The invention is not, however, limited to indirectly detecting defects and/or to current monitoring. Based on the disclosure herein, one skilled in the relevant art(s) will understand how to implement the invention to directly detects, and how to implement the invention to detect defects based on voltage monitoring, with and without a common-mode control circuit.

The method illustrated in the flowchart of FIG. 5 can be implemented with circuitry described above, and/or with any other suitable circuitry. The process begins at step 502, which includes sensing an output of the common-mode control circuit Vcm, without adversely affecting data transmission (e.g., without degrading dynamic performance of the transceiver).

Figure 6:
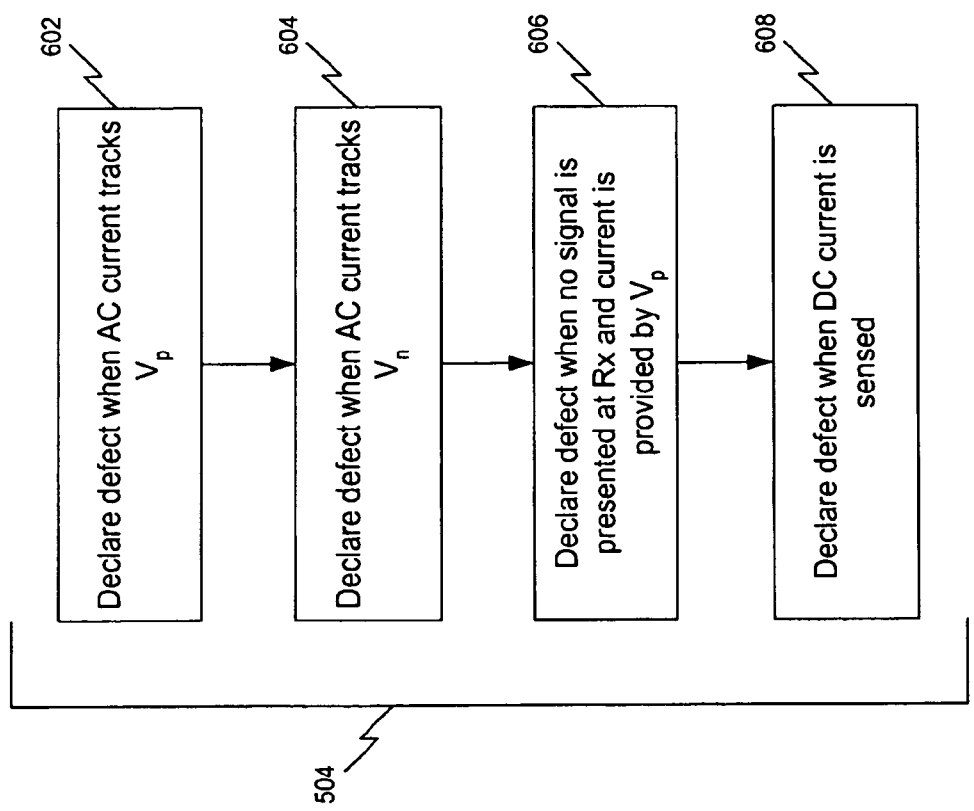
FIG. 6 is a flowchart of step 504 from FIG. 5.

Step 504 includes outputting an indication of a defect when the sensed output of the common-mode control circuit Vcm exceeds a threshold. Step 504 can be implemented to detect one or more of the potential defects described above. For example, FIG. 6 illustrates step 504 implemented with steps 602-608.

Step 602 includes outputting an indication of a defect when AC output of the common-mode control circuit Vcm tracks Vin. Step 602 is useful, for example, for detecting open circuits in the transmission line 108 and shorts between the transmission line 108 and a power supply. Step 602 is useful in other situations as well, as will be apparent to one skilled in the relevant art(s) after reading the description herein.

Step 604 includes outputting an indication of a defect when AC output from the common-mode control circuit Vcm tracks Vip. Step 604 is useful for detecting open circuits in the inverted transmission line 110 and shorts between the inverted transmission line 110 and a power supply.

Step 606 includes outputting an indication of a defect when no signal is presented at the receiver and a current and/or voltage output is provided by common-mode control circuit Vcm. Step 606 is useful for detecting short circuits between the transmission lines.

Step 608 includes outputting an indication of a defect when a DC output is provided by common-mode control circuit Vcm. Step 608 is useful for detecting short circuits across AC couplings.

Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like and combinations thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A differential receiver, comprising:
   a differential input configured to receive a differential signal having an input common-mode voltage;
   a common-mode control circuit configured to adjust the input common-mode voltage to a desired common-mode voltage by adding a correction current to a portion of the differential input; and
   a monitoring system configured to monitor the correction current provided to the differential input, and determine when the correction current exceeds a threshold, thereby representing a defect in a differential transmission line coupled to said differential input.

2. The differential receiver of claim 1, wherein the correction current is one of an AC correction current or a DC correction current.

3. The differential receiver of claim 1, wherein the monitoring circuit outputs an indication of a defect in the differential transmission line when the correction current exceeds the threshold.

4. The differential receiver of claim 3, wherein the indication identifies whether the correction current is an AC correction current or a DC correction current.

5. The differential receiver of claim 3, wherein the indication identifies when the AC correction circuit tracks the changes in the differential signal.

6. The apparatus according to claim 3, wherein the monitoring circuit is configured to output an indication of a defect when a short circuit exists across an AC coupling in an AC-coupled differential transmission lines.

7. The differential receiver according to claim 1, wherein the differential transmission line includes AC-coupled differential transmission lines, and wherein the monitoring system detects short circuits across AC-coupling capacitors in one of the AC-coupled differential transmission lines.

8. The differential receiver according to claim 1, wherein the monitoring system is coupled directly to one of the differential inputs.

9. The differential receiver according to claim 1, wherein the monitoring system is coupled indirectly to one of the differential inputs.

10. The differential receiver according to claim 1, wherein the monitoring system is configured to output an indication of a defect upon an of the following conditions:
   AC correction current is detected exceeding a predetermined threshold;
   DC correction current is sensed exceeding a predetermined threshold; or
   no signal is received by the differential receiver and a current is sensed by the current monitoring system exceeding a predetermined threshold.

11. The apparatus according to claim 1, wherein the monitoring circuit is configured to output an indication of a defect when an open circuit exists in the differential transmission line.

12. The apparatus according to claim 1, wherein the monitoring circuit is configured to output an indication of a defect when a short circuit exists between the differential transmission line and a power supply.

13. The apparatus according to claim 1, wherein the monitoring circuit is configured to output an indication of a defect when a short circuit exist in the differential transmission line.

14. In a differential receiver having a differential input, a method of detecting defects in a differential transmission line coupled to the differential input, comprising the steps of:
   receiving a differential signal having an input common-mode voltage at the differential input;
   adding a correction current to the differential signal to adjust the input common-mode voltage to a desired common-mode voltage;
   monitoring the correction current that is added to the differential signal, to determine when the correction current exceeds a threshold, thereby representing a defect in the differential transmission line coupled to the differential input.

15. The method of claim 14, further comprising the step of outputting an indication of the defect in the transmission line when the correction signal exceeds the threshold.

16. The method of claim 15, wherein the indication identifies whether the correction current is an AC correction signal or a DC correction signal.

17. The method of claim 16, wherein the indication further indicates whether the AC correction current substantially follows the differential signal.

18. A differential receiver, comprising:
   a differential input configured to receive a differential signal having an input common-mode voltage;
   means for adjusting the input common-mode voltage to a desired common-mode voltage by utilizing a correction signal; and
   means for monitoring the correction signal to determine when the correction signal exceeds a threshold, thereby representing a defect in a differential transmission line coupled to said differential input.

19. The differential receiver of claim 18, wherein said means for monitoring includes means for indicating the type of defect in the differential transmission line.

20. The differential receiver of claim 19, wherein the means for indicating includes means for indicating whether the correction signal is an AC correction signal or a DC correction signal.

* * * * *